US012577350B2

(12) United States Patent
Maeno et al.

(10) Patent No.: US 12,577,350 B2
(45) Date of Patent: Mar. 17, 2026

(54) POLYIMIDE PRECURSOR, RESIN COMPOSITION, INSULATED ELECTRIC WIRE, AND FLEXIBLE SUBSTRATE

(71) Applicant: SHOWA DENKO MATERIALS CO., LTD., Tokyo (JP)

(72) Inventors: Tomoaki Maeno, Tokyo (JP); Yasunori Kawabata, Tokyo (JP); Shota Aoyagi, Tokyo (JP); Arisa Yamauchi, Tokyo (JP)

(73) Assignee: RESONAC CORPORATION, Tokyo (JP)

( * ) Notice: Subject to any disclaimer, the term of this patent is extended or adjusted under 35 U.S.C. 154(b) by 557 days.

(21) Appl. No.: 17/908,973

(22) PCT Filed: Nov. 25, 2020

(86) PCT No.: PCT/JP2020/043829
§ 371 (c)(1),
(2) Date: Sep. 2, 2022

(87) PCT Pub. No.: WO2021/176779
PCT Pub. Date: Sep. 10, 2021

(65) Prior Publication Data
US 2023/0116635 A1 Apr. 13, 2023

(30) Foreign Application Priority Data
Mar. 3, 2020 (WO) .................. PCT/JP2020/008920

(51) Int. Cl.
*C08G 73/10* (2006.01)
*H01B 3/30* (2006.01)
(Continued)

(52) U.S. Cl.
CPC ......... *C08G 73/1082* (2013.01); *H01B 3/306* (2013.01); *H01B 13/0016* (2013.01); *H01B 13/16* (2013.01)

(58) Field of Classification Search
CPC ............ C08G 73/1082; C08G 73/1042; C08G 73/105; C08G 73/1007; H01B 3/306;
(Continued)

(56) References Cited

U.S. PATENT DOCUMENTS

| | | | | |
|---|---|---|---|---|
| 2007/0169886 A1* | 7/2007 | Watanabe | ............... | B32B 15/20 |
| | | | | 428/411.1 |
| 2009/0305046 A1* | 12/2009 | Bito | ........................ | C09J 179/08 |
| | | | | 428/458 |

(Continued)

FOREIGN PATENT DOCUMENTS

| | | |
|---|---|---|
| CN | 105143310 A | 12/2015 |
| CN | 110382626 A | 10/2019 |

(Continued)

OTHER PUBLICATIONS

Machine Translation JP2015134842 (Year: 2015).*

*Primary Examiner* — Jennifer A Steele
(74) *Attorney, Agent, or Firm* — FITCH, EVEN, TABIN & FLANNERY, LLP

(57) ABSTRACT

Provided is a polyimide precursor including a polyimide precursor obtained by a reaction between a diamine compound and a tetracarboxylic dianhydride compound, in which the diamine compound contains at least one type selected from the group consisting of an aromatic diamine and an alicyclic diamine, the tetracarboxylic dianhydride compound contains at least one type selected from the group consisting of an aromatic tetracarboxylic dianhydride and an alicyclic tetracarboxylic dianhydride, and the total amount of the alicyclic diamine and the alicyclic tetracarboxylic (Continued)

dianhydride is 5.0 mol % or more and 70.0 mol % or less with respect to the total amount of constituent monomers of the polyimide precursor.

16 Claims, 1 Drawing Sheet

(51) Int. Cl.
*H01B 13/00* (2006.01)
*H01B 13/16* (2006.01)

(58) Field of Classification Search
CPC .. H01B 13/0016; H01B 13/16; C09D 179/08;
C09J 179/08
See application file for complete search history.

(56) References Cited

U.S. PATENT DOCUMENTS

| | | | |
|---|---|---|---|
| 2010/0304160 | A1 | 12/2010 | Fukukawa et al. |
| 2016/0032055 | A1 | 2/2016 | Urakami et al. |
| 2017/0275425 | A1* | 9/2017 | Sato ........................... C08J 5/18 |
| 2018/0208766 | A1 | 7/2018 | Nakayama et al. |
| 2019/0044149 | A1 | 2/2019 | Serizawa |
| 2019/0225754 | A1 | 7/2019 | Nukada et al. |
| 2020/0129377 | A1* | 4/2020 | Fukukawa ................. C08J 5/18 |
| 2020/0362113 | A1* | 11/2020 | Kiuchi ................. C08G 73/105 |

FOREIGN PATENT DOCUMENTS

| | | | |
|---|---|---|---|
| EP | 3272786 A1 * | 1/2018 | ......... C08G 73/1007 |
| JP | 2015134842 A * | 7/2015 | |
| TW | 201500464 A | 1/2015 | |
| TW | 201641539 A | 12/2016 | |
| WO | 2009/069688 A1 | 6/2009 | |
| WO | 2018/173920 A1 | 9/2018 | |
| WO | 2019/188898 A1 | 3/2019 | |

* cited by examiner

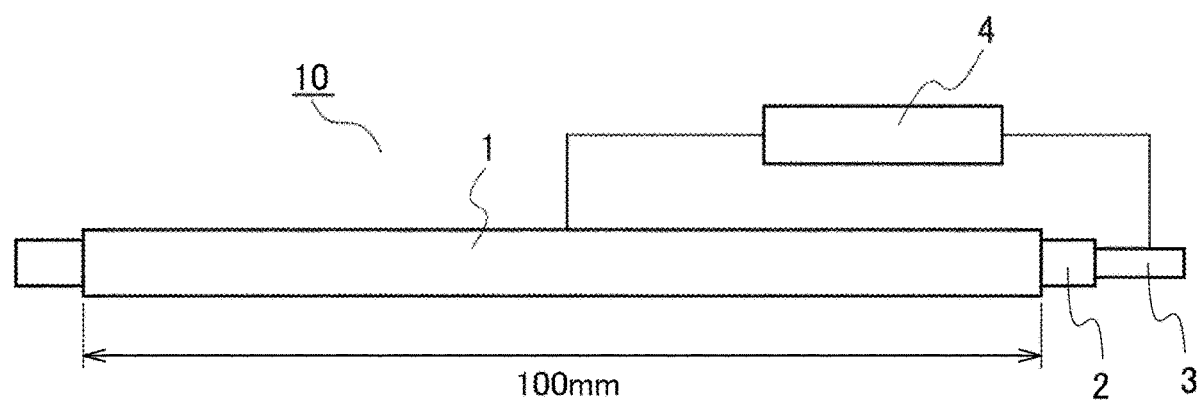

POLYIMIDE PRECURSOR, RESIN COMPOSITION, INSULATED ELECTRIC WIRE, AND FLEXIBLE SUBSTRATE

CROSS-REFERENCE TO RELATED APPLICATIONS

This application is a U.S. national phase application filed under 35 U.S.C. § 371 of International Application No. PCT/JP2020/043829, filed Nov. 25, 2020, designating the United States, which claims priority from Japanese Application No. PCT/JP2020/008920, filed Mar. 3, 2020, which are hereby incorporated herein by reference in their entirety.

TECHNICAL FIELD

One of embodiments of the present invention relates to a polyimide precursor, an insulated electric wire, a flexible substrate, a resin composition containing the polyimide precursor, and methods for manufacturing the insulated electric wire and the flexible substrate.

BACKGROUND ART

Inverter control electrical devices are widely used for energy saving and variable speed control. In particular, efficiency is increasing in hybrid types, electric types, and other such types of motors for automobiles, motors for industry, and so forth, and inverter drive motors are rapidly becoming smaller, lighter, and more heat resistant and are being driven by higher voltages. In recent years, due to the higher frequencies and higher voltages of operating voltages, there has been a problem of high surge voltages being generated from inverter drive motors and entering the motors, and there being a decrease in the withstand voltage life of the motors.

One of the causes of this problem is that when a high voltage is applied to a motor coil, partial discharge is sometimes likely to occur in the resin film of an insulated electric wire. The occurrence of partial discharge can lead to an increase in localized insulation degradation and ultimately to dielectric breakdown, which can be one factor in the shortening of the life of an insulated electric wire and a motor.

Patent Document 1 proposes an insulated electric wire in which a conductor is covered with an insulation layer of a thermoplastic resin containing bubbles. In Cited Document 1, an attempt is made to obtain a high partial discharge inception voltage and a high dielectric breakdown voltage by specifying the shape of the bubbles in the insulation layer of the insulated electric wire.

As insulation materials, polyimide resins, polyamide resins, and the like are used in various uses due to reasons such as excellent heat resistance, chemical resistance, and hydrolysis resistance. Polyimide resins exhibit low permittivity and are therefore suitable materials for insulated electric wires.

CITATION LIST

Patent Documents

Patent Document 1: WO 2019/188898

SUMMARY OF INVENTION

Technical Problem

In Cited Document 1, an attempt is made to obtain a low permittivity and increase the partial discharge inception voltage by including bubbles in an insulation layer of an insulated electric wire. However, when bubbles are included in an insulation coating film, the flexibility of the insulation coating film itself may decrease and the workability of the insulated electric wire may decrease.

An object of the present invention is to increase the partial discharge inception voltage of an insulated electric wire.

Solution to Problem

One aspect of the present disclosure is a polyimide precursor including a polyimide precursor obtained by a reaction between a diamine compound and a tetracarboxylic dianhydride compound, in which the diamine compound contains at least one type selected from the group consisting of an aromatic diamine and an alicyclic diamine, the tetracarboxylic dianhydride compound contains at least one type selected from the group consisting of an aromatic tetracarboxylic dianhydride and an alicyclic tetracarboxylic dianhydride, and the total amount of the alicyclic diamine and the alicyclic tetracarboxylic dianhydride is 5.0 mol % or more and 70.0 mol % or less with respect to a total amount of constituent monomers of the polyimide precursor.

Another aspect of the present disclosure is an insulated electric wire including a conductor and a resin film that covers the conductor, in which the resin film is a polyimide resin film obtained using the polyimide precursor. Yet another aspect of the present disclosure is a flexible substrate including a polyimide formed using the polyimide precursor.

Yet another aspect of the present disclosure is a resin composition containing the polyimide precursor and a solvent. Yet another aspect of the present disclosure is a method for manufacturing an insulated electric wire, the method including applying the resin composition to a conductor and performing heating. Yet another aspect of the present disclosure is a method for manufacturing a flexible substrate, the method including applying the resin composition and performing heating.

Advantageous Effects of Invention

According to one of embodiments, the partial discharge inception voltage of an insulated electric wire can be increased by forming a resin film of the insulated electric wire using a polyimide precursor.

BRIEF DESCRIPTION OF THE DRAWINGS

The FIGURE is an explanatory diagram of a method for measuring relative permittivity.

DETAILED DESCRIPTION OF THE EMBODIMENTS

One of embodiments of the present invention is described below, but the present invention is not limited thereto.

First Embodiment

A polyimide precursor for an insulated electric wire according to one of embodiments is a polyimide precursor including a polyimide precursor obtained by a reaction between a diamine compound and a tetracarboxylic dianhydride compound, characterized in that the diamine compound contains at least one type selected from the group consisting of an aromatic diamine and an alicyclic diamine, the tetracarboxylic dianhydride compound contains at least one type selected from the group consisting of an aromatic tetracarboxylic dianhydride and an alicyclic tetracarboxylic dianhydride, and the total amount of the alicyclic diamine and the alicyclic tetracarboxylic dianhydride is 5.0 mol % or more and 70.0 mol % or less with respect to the total amount of constituent monomers of the polyimide precursor.

The partial discharge inception voltage (PDIV) of an insulated electric wire can be increased by forming a resin film of the insulated electric wire using this polyimide precursor. This polyimide precursor can provide a polyimide resin film having a low permittivity. This polyimide precursor provides a low permittivity and a high partial discharge inception voltage, and is therefore useful when applied to inverter drive motors, other high voltage drive motors, inverter control electrical devices, and the like. Furthermore, this polyimide precursor can provide an excellent partial discharge inception voltage due to having a low permittivity, even with a reduced thickness of the resin film of the insulated electric wire.

In order to extend the life of an insulated electric wire and a motor using the same, suppressing the occurrence of partial discharge in a resin film of the insulated electric wire is promising. To suppress the occurrence of partial discharge, there is the method of lowering the relative permittivity of the resin film to increase the partial discharge inception voltage.

A polyimide precursor according to one of embodiments is provided with an alicyclic structure, and it is thereby possible to lower the relative permittivity of the obtained polyimide resin film.

Although not bound by theory, the polarization of π electrons of numerous aromatic rings can affect the molecular structure that results from the relative permittivity of the obtained polyimide resin film. Furthermore, improving the free volume of molecules is effective in lowering the permittivity. In one of embodiments, it is thought that providing a polyimide resin with an alicyclic structure makes it possible to reduce the number of π electrons, improve the free volume of molecules, and lower the relative permittivity compared to a polyimide resin comprising only an aromatic ring structure.

When the proportion of alicyclic structure in a polyimide resin increases, the heat resistance tends to be inferior compared to a polyimide resin comprising only an aromatic ring structure, but by specifying the proportion of alicyclic structure to be incorporated, sufficient heat resistance can be obtained.

Even if an attempt is made to reduce the electric field by lowering the permittivity of the resin film to suppress partial discharge, it is difficult to completely eliminate partial discharge. To prevent degradation and dielectric breakdown of the resin film caused by this partial discharge, it is important to increase the partial discharge inception voltage by lowering the permittivity of the resin film.

By providing a polyimide precursor according to one of embodiments with an alicyclic structure and also specifying the proportion of alicyclic structure to be incorporated, it is possible to lower the relative permittivity of an obtained polyimide resin film.

Motors for automobiles, particularly motors for hybrid automobiles and motors for electric automobiles, are often installed in the presence of transmission oil, and the windings used in motors are required to be resistant to transmission oil and to not be hydrolyzed by the moisture in the oil. Also from this kind of viewpoint, a polyimide resin film that can withstand use at high temperatures can be preferably used as a resin film of an insulated electric wire.

Furthermore, with a polyimide precursor according to one of embodiments, the obtained polyimide resin film itself has a low relative permittivity, and therefore, even if the polyimide resin film does not contain bubbles or a filler, it is possible to achieve a low permittivity suitable for an insulated electric wire and a motor using the same.

A polyimide precursor according to one of embodiments can be obtained by a reaction between a diamine compound and a tetracarboxylic dianhydride compound. This reaction can be carried out by mixing and polymerizing a diamine compound and a tetracarboxylic dianhydride compound in an organic solvent.

In a polyimide precursor according to one of embodiments, it is preferable that the total amount of an alicyclic diamine and an alicyclic tetracarboxylic dianhydride be 5.0 mol % or more and 70.0 mol % or less with respect to the total amount of constituent monomers of the polyimide precursor.

The total amount of the alicylic diamine and the alicyclic tetracarboxylic dianhydride is preferably 5.0 mol % or more, more preferably 7.0 mol % or more, and even more preferably 10.0 mol % or more with respect to the total amount of constituent monomers of the polyimide precursor. It is thereby possible to lower the relative permittivity of the obtained polyimide resin film.

The total incorporated amount of the alicyclic diamine and the alicyclic tetracarboxylic dianhydride is preferably 70.0 mol % or less, more preferably 50.0 molo or less, even more preferably 40.0 mol % or less, and still more preferably 30.0 mol % or less with respect to the total amount of constituent monomers of the polyimide precursor. It is thereby possible to prevent a reduction in heat resistance.

For example, the total amount of the alicylic diamine and the alicylic tetracarboxylic dianhydride is preferably 5.0 mol % or more and 70.0 mol % or less, more preferably 7.0 mol % or more and 50.0 mol % or less, even more preferably 10.0 mol % or more and 30.0 mol % or less, and particularly preferably 11.0 mol % or more and 30.0 mol % or less with respect to the total amount of constituent monomers of the polyimide precursor. In these ranges, it is possible to lower the relative permittivity while maintaining various characteristics.

Here, the polyimide precursor contains a tetracarboxylic dianhydride compound and a diamine compound at a molar ratio of approximately 1:1 due to the tetracarboxylic dianhydride compound and the diamine compound polymerizing at a 1:1 molar equivalent.

Also, when two or more types of diamine compounds are used, the two or more types of diamine compounds are introduced into the polyimide precursor with the molar ratio that is input into the synthesis system being maintained. Due to this, the amount of alicyclic diamine with respect to the total amount of constituent monomers of the polyimide precursor can be obtained with the formula below using the molar ratio of the diamine compound that is input into the synthesis system.

$$((\text{Alicyclic diamine})/(\text{total amount of diamine compound}))\times0.5 \text{ (mol \%)}$$

The amount of alicyclic diamine with respect to the total amount of the diamine compound can be obtained with the formula below using the molar ratio of the diamine compound that is input into the synthesis system.

$$(\text{Alicyclic diamine})/(\text{total amount of diamine compound}) \text{ (mol \%)}$$

Furthermore, when two or more types of tetracarboxylic dianhydride compounds are used, the two or more types of tetracarboxylic dianhydride compounds are introduced into the polyimide precursor with the molar ratio that is input into the synthesis system being maintained. Due to this, the amount of alicyclic tetracarboxylic dianhydride with respect to the total amount of constituent monomers of the polyimide precursor can be obtained with the formula below using the molar ratio of the tetracarboxylic dianhydride compound that is input into the synthesis system.

$$((\text{Alicyclic tetracarboxylic dianhydride})/(\text{total amount of tetracarboxylic dianhydride compound}))\times 0.5 \ (\text{mol \%})$$

The amount of alicyclic tetracarboxylic dianhydride with respect to the total amount of tetracarboxylic dianhydride compound can be obtained with the formula below using the molar ratio of the tetracarboxylic dianhydride compound that is input into the synthesis system.

$$(\text{Alicyclic tetracarboxylic dianhydride})/(\text{total amount of tetracarboxylic dianhydride compound}) \ (\text{mol \%})$$

The polyimide precursor preferably contains an alicyclic diamine.

The alicyclic diamine is preferably 10.0 mol % or more and 100.0 mol % or less with respect to the total amount of the diamine compound.

In the polyimide precursor, when an alicyclic diamine is included in the diamine compound, an aromatic diamine, an aliphatic diamine, or a combination thereof may be included together with the alicyclic diamine, and it is preferable that an aromatic diamine be included together with the alicyclic diamine. By including an aromatic diamine, it is possible to prevent a reduction in heat resistance.

The aromatic diamine is preferably 0-90.0 mol %, more preferably 20.0-85.0 mol %, and even more preferably 40.0-80.0 mol % with respect to the total amount of the diamine compound.

Note that, in the polyimide precursor, when an alicyclic diamine is included in the diamine compound, an alicyclic tetracarboxylic dianhydride may be included in the tetracarboxylic dianhydride compound, or from the viewpoint of heat resistance, the tetracarboxylic dianhydride compound may be obtained from only an aromatic tetracarboxylic dianhydride.

The polyimide precursor preferably contains an alicyclic tetracarboxylic dianhydride.

The alicylic tetracarboxylic dianhydride is preferably 10.0 mol % or more and 100.0 mol % or less with respect to the total amount of the tetracarboxylic dianhydride compound.

The alicyclic tetracarboxylic dianhydride is preferably 10.0 mol % or more, more preferably 15.0 mol % or more, and even more preferably 20.0 mol % or more with respect to the total amount of the tetracarboxylic dianhydride compound. It is thereby possible to lower the relative permittivity of the obtained polyimide resin film.

The alicyclic tetracarboxylic dianhydride is preferably 100.0 mol % or less, more preferably 80.0 mol % or less, even more preferably 70.0 mol % or less, and still more preferably 60.0 mol % or less with respect to the total amount of the tetracarboxylic dianhydride compound. It is thereby possible to prevent a reduction in heat resistance.

For example, the alicyclic tetracarboxylic dianhydride is preferably 10.0-100.0 mol %, more preferably 15.0-80.0 mol %, and even more preferably 20.0-60.0 mol % with respect to the total amount of the tetracarboxylic dianhydride compound. In these ranges, it is possible to lower the relative permittivity while maintaining various characteristics.

In the polyimide precursor, when an alicyclic tetracarboxylic dianhydride is included in the tetracarboxylic dianhydride compound, an aromatic tetracarboxylic dianhydride, an aliphatic tetracarboxylic dianhydride, or a combination thereof may be included together with the alicyclic tetracarboxylic dianhydride, and it is preferable that an aromatic tetracarboxylic dianhydride be included together with the alicyclic tetracarboxylic dianhydride. By including an aromatic tetracarboxylic dianhydride, it is possible to prevent a reduction in heat resistance.

The aromatic tetracarboxylic dianhydride is preferably 0-90.0 mol %, more preferably 20.0-85.0 mol %, and even more preferably 40.0-80.0 mol % with respect to the total amount of the tetracarboxylic dianhydride compound.

Note that, in the polyimide precursor, when an alicyclic tetracarboxylic dianhydride is included in the tetracarboxylic dianhydride compound, an alicyclic diamine may be included in the diamine compound, or from the viewpoint of heat resistance, the diamine compound may be obtained from only an aromatic diamine.

The diamine compound can contain at least one type selected from the group consisting of an aromatic diamine and an alicyclic diamine.

In the aromatic diamine, the aromatic ring may be any of a monocyclic, bicyclic, tricyclic, tetracyclic, or other polycyclic ring structure or a condensed ring structure, and may be either an aromatic hydrocarbon ring or an aromatic heterocycle. The aromatic diamine is preferably provided with a monocylic structure such as a benzene ring, or a bicyclic structure such as biphenyl, diphenylmethane, or diphenyl ether.

Furthermore, the aromatic diamine may have introduced thereto a nitrogen atom, fluorine atom, sulfonyl group, sulfo group, alkyl group, or the like.

Examples of the aromatic diamine include 4,4'-diaminodiphenylmethane, 3,3'-diaminodiphenylmethane, 3,4'-diaminodiphenylmethane, 4,4'-diamino-3,3'-dimethyldiphenylmethane, 4,4'-diaminodiphenylethane, 4,4'-diaminodiphenyl ether, 4,3'-diaminodiphenyl ether, 4,4'-diaminobiphenyl, 3,3'-diaminobiphenyl, 3,4'-diaminobiphenyl, 4,4'-diamino-3,3'-dimethylbiphenyl, 4,4'-diamino-2,2'-dimethylbiphenyl, 4,4'-diamino-3,3'-diethylbiphenyl, 4,4'-diamino-2,2'-diethylbiphenyl, 4,4'-diamino-3,3'-dimethoxybiphenyl, 4,4'-diamino-2,2'-dimethoxybiphenyl, 4,4'-bis(4-aminophenoxy) biphenyl, 1,5-diaminonaphthalene, 2,6-diaminonaphthalene, 3-aminobenzylamine, 4-aminobenzylamine, tolylenediamine, m-xylylenediamine, and p-xylylenediamine.

From thereamong, 4,4'-diaminodiphenyl ether, 4,4'-bis(4-aminophenoxy) biphenyl, or a combination thereof is preferable.

In the alicyclic diamine, the alicyclic structure may be any of a cycloalkane, cycloalkene, or cycloalkyne, and may be any of a monocyclic structure or a polycyclic structure such as bicyclic, tricyclic, or tetracyclic structure.

In the alicyclic diamine, the carbon number of the alicyclic structure is preferably 3-20, more preferably 4-12, and even more preferably 6-10. This alicyclic structure is preferably a cycloalkane, and examples include cycloalkanes such as cyclopropane, cyclobutane, cyclopentane, cyclohexane, cycloheptane, cyclooctane, cyclononane, cyclodecane, cycloundecane, cyclododecane, norbornane, and polycyclic structures having two or more of these cycloalkanes. From thereamong, the alicyclic diamine preferably contains a cyclohexane or norbornane alicyclic structure, and more preferably contains one or two cyclohexane or norbornane alicyclic structures per molecule.

The alicyclic diamine is preferably provided with a structure in which two cyclohexanes are bonded by a single bond or an alkylene group, and is more preferably provided with a bicyclic structure such as bicyclohexyl or dicyclohexylmethane.

Furthermore, the alicyclic diamine may have introduced thereto a nitrogen atom, fluorine atom, sulfonyl group, sulfo group, alkyl group, or the like.

Examples of the alicyclic diamine include 4,4'-methylenebis(cyclohexylamine), 4,4'-methylenebis(2-methylcyclohexylamine), 1,3-bis(aminomethyl)cyclohexane, 1,4-bis(aminomethyl)cyclohexane, 1,3-cyclohexanediamine, 1,4-cyclohexanediamine, isophoronediamine, norbornane diamine, bis(aminomethyl) norbornane, and hydrogenated m-xylylenediamine.

From thereamong, 4,4'-methylenebis(cyclohexylamine), 4,4'-methylenebis(2-methylcyclohexylamine), norbornane diamine, or a combination thereof is preferable.

As the diamine compound, an aliphatic diamine compound such as hexamethylenediamine and 2,2,4-trimethylhexamethylenediamine may be used in combination.

One type of the diamine compounds described above may be used or a combination of two or more types may be used.

Using a combination of two or more types of diamine compounds can improve the fluidity and further improve the coating property for a resin composition containing the polyimide precursor. This is thought to be because mixing two or more types of diamine compounds makes it possible to suppress the formation of by-products such as poorly soluble salts in a resin composition.

When the diamine compound contains an alicyclic diamine, it is preferable to use two or more types of alicyclic diamines. When the proportion of a single-structure alicyclic diamine increases, there is a tendency for by-products such as poorly soluble salts to be likely to form in the resin composition. By using two or more types of alicyclic diamines, for example, the total incorporated amount of alicyclic diamines is increased, and the coating property of the resin composition can also be further improved while making it possible to achieve a low permittivity and a high dielectric breakdown voltage.

The tetracarboxylic dianhydride can include at least one type selected from the group consisting of aromatic tetracarboxylic dianhydride and alicyclic tetracarboxylic dianhydride. In the aromatic tetracarboxylic dianhydride, the aromatic ring may be any of a monocyclic, bicyclic, tricyclic, tetracyclic, or other polycyclic ring structure or a condensed ring structure, and may be either an aromatic hydrocarbon ring or an aromatic heterocycle. The aromatic tetracarboxylic dianhydride is preferably provided with a monocyclic structure such as a benzene ring, or a bicyclic structure such as biphenyl, diphenylmethane, or diphenyl ether. Furthermore, the aromatic tetracarboxylic dianhydride may also have introduced thereto a nitrogen atom, fluorine atom, sulfonyl group, sulfo group, alkyl group, or the like.

Examples of the aromatic tetracarboxylic dianhydride include pyromellitic dianhydride, 3,3',4,4'-biphenyltetracarboxylic dianhydride, 2,3,3',4'-biphenyltetracarboxylic dianhydride, 3,3',4,4'-benzophenone tetracarboxylic dianhydride, 4,4'-oxydiphthalic anhydride, 3,4'-oxydiphthalic anhydride, 4,4'-sulfonyldiphthalic anhydride. 1,2,5,6-naphthalene tetracarboxylic dianhydride, 1,4,5,8-naphthalene tetracarboxylic dianhydride, 2,3,5,6-perylene tetracarboxylic dianhydride, 3,4,9,10-perylene tetracarboxylic dianhydride, m-terphenyl-3,3',4,4'-tetracarboxylic dianhydride, 2,2-bis(2, 3- or 3,4-dicarboxyphenyl) propane dianhydride, 2,2-bis[4-(2,3- or 3,4-dicarboxyphenoxy)phenyl]propane dianhydride, 1,1,1,3,3,3-hexafluoro-2,2-bis(2,3- or 3,4-dicarboxyphenyl) propane dianhydride, 1,1,1,3,3,3-hexafluoro-2,2-bis[4-(2,3- or 3,4-dicarboxyphenoxy) phenyl]propane dianhydride, and 1,3-bis(3,4-dicarboxyphenyl)-1,1,3,3-tetramethyldisiloxane dianhydride.

From thereamong, pyromellitic dianhydride, 3,3',4,4'-biphenyltetracarboxylic dianhydride, or a combination thereof is preferable. From the viewpoint of an improvement in volume resistivity and the accompanying improvement in dielectric breakdown voltage in the obtained polyimide, a monocyclic or condensed ring structure is more preferable than a biphenyl backbone. An example of this kind of compound is pyromellitic dianhydride.

In the alicyclic tetracarboxylic dianhydride, the alicyclic structure may be any of a cycloalkane, cycloalkene, or cycloalkyne, and may be any of a monocyclic structure or a polycyclic structure such as bicyclic, tricyclic, or tetracyclic structure.

In the alicyclic tetracarboxylic dianhydride, the carbon number of the alicylic structure is preferably 3-20, more preferably 4-12, and even more preferably 6-10. Examples of this alicyclic structure include cycloalkanes such as cyclopropane, cyclobutane, cyclopentane, cyclohexane, cycloheptane, cyclooctane, cyclononane, cyclodecane, cycloundecane, and cyclododecane, and polycyclic structures having two or more of these cycloalkanes. From thereamong, the alicyclic tetracarboxylic dianhydride preferably contains a cyclohexane or norbornane alicyclic structure, and more preferably contains one or two cyclohexane or norbornane alicyclic structures per molecule.

The alicyclic diamine is preferably provided with a structure in which two cyclohexanes are bonded by a single bond or an alkylene group, and is more preferably provided with a bicyclic structure such as bicyclohexyl or dicyclohexylmethane.

Furthermore, the alicyclic tetracarboxylic dianhydride may also have introduced thereto a nitrogen atom, fluorine atom, sulfonyl group, sulfo group, alkyl group, or the like.

Examples of the alicyclic tetracarboxylic dianhydride include 1,2,4,5-cyclohexane tetracarboxylic dianhydride, 1,2,3,4-cyclopentane tetracarboxylic dianhydride, 1,2,3,4-cyclobutane tetracarboxylic dianhydride, 1,2,3,4-tetramethyl-1,2,3,4-cyclobutane tetracarboxylic dianhydride, bicyclo[2.2.2]-oct-7-ene-2,3,5,6-tetracarboxylic dianhydride, and 5-(2,5-dioxotetrahydrofural)-3-methyl-3-cyclohexene-1,2-dicarboxylic dianhydride.

The tetracarboxylic dianhydride may further contain an aliphatic tetracarboxylic dianhydride such as butane tetracarboxylic dianhydride.

One type of the tetracarboxylic dianhydrides described above may be used or a combination of two or more types may be used.

In one of embodiments, the number average molecular weight of the polyimide precursor is preferably 10,000-60,000, and more preferably 20,000-50,000. When the number average molecular weight is greater than or equal to this lower limit, the film-forming property can be further improved when making the coating material. Furthermore, when the number average molecular weight is less than or equal to this upper limit, an increase in viscosity can be suppressed and the coating property can be further improved when making the coating material.

In the present specification, the number average molecular weight of the resin is a value measured by gel permeation chromatography (GPC) and converted using a standard polystyrene calibration curve.

It is sufficient for the polyimide precursor according to one of embodiments to have the configuration described above, and the manufacturing method thereof is not limited. An example of a method for manufacturing a polyimide precursor will be described below, but the polyimide precursor according to one of embodiments is not limited to that manufactured by the following manufacturing method.

As a method for manufacturing a polyimide precursor, it is possible to include causing a reaction between the diamine compound and the tetracarboxylic dianhydride compound.

The diamine compound can contain at least one type selected from the group consisting of an aromatic diamine and an alicyclic diamine.

The tetracarboxylic dianhydride compound can include at least one type selected from the group consisting of aromatic tetracarboxylic dianhydride and alicyclic tetracarboxylic dianhydride.

The details of the diamine compound and the tetracarboxylic dianhydride compound are as described above.

The mixing ratio of the diamine compound and the tetracarboxylic dianhydride compound is preferably 1.00:0.95-1.00:1.05 by molar ratio, more preferably approximately 1:1.

The reaction between the diamine compound and tetracarboxylic dianhydride can be performed by solution polymerization.

Examples of a synthesis solvent include polar solvents such as N-methyl-2-pyrrolidone, N,N'-dimethylformamide, γ-butyrolactone, N,N'-dimethylpropyleneurea[1,3-dimethyl-3,4,5,6-tetrahydropyrimidine-2 (1h)-one], dimethyl sulfoxide, diethylene glycol dimethyl ether, triethylene glycol dimethyl ether, dimethylacetamide, and sulfolane; aromatic hydrocarbon solvents such as xylene and toluene; and ketones such as methyl ethyl ketone and methyl isobutyl ketone. One of these may be used alone or a combination of two or more may be used.

The amount of synthesis solvent used during the reaction is preferably 100-600 parts by mass and more preferably 200-400 parts by mass with respect to 100 parts by mass of the total amount of the diamine compound and tetracarboxylic dianhydride. Due to the amount of synthesis solvent used being 100 mass parts or more, each component can be reacted homogeneously. Due to the amount of synthesis solvent used being 600 mass parts or less, the polymerization reaction can be promoted. Furthermore, due to the amount of synthesis solvent used being low, the resin concentration of the obtained resin composition can be increased, and the coating film can be made thicker when making the coating material.

The polyimide precursor synthesized according to the method described above can be provided with a number average molecular weight in the ranges described above. For example, the number average molecular weight can be adjusted by sampling the polyimide precursor during synthesis and continuing the synthesis until the desired number average molecular weight is achieved.

The reaction temperature and reaction time are not particularly restricted, but the reaction can be progressed by mixing raw materials in the synthesis solvent at room temperature.

An insulated electric wire according to one of embodiments includes a conductor and a resin film that covers the conductor, in which the resin film is a polyimide resin film obtained using a polyimide precursor for an insulated electric wire.

The polyimide resin film can be obtained using the polyimide precursor for an insulated electric wire described above. The polyimide resin film can be formed by curing the polyimide precursor by heating.

The conductor may be, for example, a metal wire such as copper, copper alloy, aluminum, or aluminum alloy. The cross-sectional shape of the metal wire may be circular, square, rectangular, flat, or the like.

The relative permittivity of the polyimide resin film is preferably 2.0-3.5. The relative permittivity of the polyimide resin film is preferably 3.5 or less, more preferably 3.4 or less, and even more preferably 3.3 or less. It is thereby possible to provide an insulating property appropriate for an insulated electric wire. Furthermore, the partial discharge inception voltage can be increased.

The relative permittivity of the polyimide resin film can be obtained by measuring the capacitance of the resin film with an LCR meter at room temperature, and calculating the permittivity from the measured capacitance value and the thickness of the resin film.

The dielectric breakdown voltage of the polyimide resin film is preferably 6-30 kV. The dielectric breakdown voltage of the polyimide resin film is preferably 6 kV or more, more preferably 8 kV or more, even more preferably 10 kV or more, and still more preferably 12 kV or more. It is thereby possible to provide an insulating property appropriate for an insulated electric wire.

The softening resistance temperature of the polyimide resin film is preferably 300-600° C. The softening resistance temperature of the polyimide resin film is preferably 300° C. or more, more preferably 350° C. or more, and even more preferably 400° C. or more. It is thereby possible to withstand use also in high temperature environments.

The dielectric breakdown voltage and the softening resistance of the polyimide resin film can be measured based on JIS C3216.

The resin composition for an insulated electric wire according to one of embodiments is a resin composition for an insulated electric wire containing the polyimide precursor described above and a solvent. As the solvent, those listed above as synthesis solvents described above can be used.

For this resin composition, when solution polymerization of the polyimide precursor is performed, a mixture of the obtained polyimide precursor and the synthesis solvent may be used as it is. Furthermore, the resin composition may also be obtained by removing excess synthesis solvent from the obtained mixture or by further adding a dilution solvent.

This resin composition can be preferably used as a coating material for an insulated electric wire.

The resin content of this resin composition is preferably 5-50% by mass, and more preferably 10-30% by mass. In these ranges, the resin composition can be adjusted to a more desirable viscosity range as a coating material.

The viscosity of the resin composition at 30° C. is preferably 1-10 Pa's and more preferably 1-5 Pa·s.

Here, the viscosity is a numerical value that is measured using a No. 3 rotor at 30° C. in a rotary B-type viscometer.

This resin composition may contain additives as necessary. Examples of additives include colorants such as pigments and dyes, inorganic fillers, organic fillers, and lubricants. By including a filler such as an inorganic filler or organic filler in the resin composition, the obtained polyimide resin film contains a filler having a low permittivity, and it therefore becomes possible to lower the permittivity of the resin film. However, the polyimide resin film according to one of embodiments exhibits a low permittivity by itself, and therefore, from the viewpoint of flexibility, it can be preferably applied also for uses for which a filler is not to be included in the polyimide resin film.

A method for manufacturing an insulated electric wire according to one of embodiments can include the resin composition for an insulated electric wire described above being applied to a conductor and heated. According to this method, it is possible to provide an insulated electric wire having high insulation reliability and excellent chemical resistance, hydrolysis resistance, heat resistance, partial discharge inception voltage characteristics, and so forth.

The method for applying the resin composition to the conductor may be a method in which the resin composition is applied to the surface of the conductor, a method in which the conductor is immersed in the resin composition, or the like.

As a method for applying the resin composition to a metal wire, die coating, felt coating, and the like are preferred. Other methods include brush application and immersion application (dipping).

A metal wire may be wound around to form a coil, and the resin composition may be applied to this coil. Methods for applying the resin composition to a coil include a method in which the resin composition is dripped onto the coil to impregnate the coil therewith, a method in which the coil is immersed in the resin composition (dipping), and the like.

It is sufficient for the amount of resin composition applied to the conductor to be adjusted as appropriate according to the thickness of the resin film after curing. The thickness of the resin film after curing is preferably 10-150 μm, and more preferably 10-100 μm. Here, the thickness of the resin film can be measured by using a micrometer.

The resin composition applied to the conductor can be cured by heating to form a polyimide resin film.

The heating temperature is preferably 260° C.-520° C. Due to the heating temperature being greater than or equal to this lower limit, solvents are removed from the resin film for there to be no residual solvents remaining, and curing of the resin film is promoted and the characteristics can be further improved. Furthermore, if a polar solvent remains in the resin film, resin components may dissolve or swell in the polar solvent and there may be degradation in the characteristics of the resin film. Due to the heating temperature being less than or equal to this upper limit, degradation of the resin film during heating can be prevented.

The heating time is preferably 1 second to 1 hour. In this range, it is possible to ensure that no residual solvents remain in the resin film. Furthermore, by ensuring that the heating time is not excessively long, degradation of the resin film during heating can be prevented.

The polyimide resin film according to one of embodiments may be formed as a single layer or multiple layers on the conductor. Other resin films may also be formed together with the polyimide resin film according to one of embodiments on the conductor. The other resin films may be other polyimide resin films, polyamide-imide resin films, or the like.

With the method described above, it is possible to obtain an insulated electric wire in which the conductor is covered by a polyimide resin film obtained by heating a polyimide precursor. This insulated electric wire can provide high partial discharge inception voltage characteristics.

Furthermore, it is possible to improve the dielectric breakdown resistance in stators or rotors having a coil in which this insulated electric wire is wound, and also inverter drive motors, other high voltage drive motors, and inverter control electrical devices using these stators or rotors.

Furthermore, the polyimide resin film obtained using the polyimide precursor according to one of embodiments is excellent in terms of the above characteristics even in a thin film state, and therefore can also contribute to reductions in size and weight of these devices.

Examples of the inverter drive motors mentioned above include motors for hybrid automobiles, motors for electric automobiles, motors for hybrid diesel locomotives, motors for electric motorcycles, motors for elevators, and motors used in construction machinery.

Second Embodiment

A polyimide precursor according to one of embodiments is a polyimide precursor including a polyimide precursor obtained by a reaction between a diamine compound and a tetracarboxylic dianhydride compound, characterized in that the diamine compound contains at least one type selected from the group consisting of an aromatic diamine and an alicyclic diamine, the tetracarboxylic dianhydride compound contains at least one type selected from the group consisting of an aromatic tetracarboxylic dianhydride and an alicyclic tetracarboxylic dianhydride, and the total amount of the alicylic diamine and the alicyclic tetracarboxylic dianhydride is 5.0 mol % or more and 70.0 mol % or less with respect to the total amount of constituent monomers of the polyimide precursor.

The partial discharge inception voltage (PDIV) can be increased by forming a polyimide using this polyimide precursor. This polyimide precursor can provide a polyimide having a low permittivity. This polyimide precursor can be preferably used for a polyimide precursor for an insulated electric wire or a polyimide precursor for a flexible substrate.

In a second embodiment, a polyimide precursor, a polyimide formed using the polyimide precursor, a resin composition containing the polyimide precursor, an insulated electric wire, and methods for manufacturing these are as described in the first embodiment above, and therefore descriptions thereof are omitted.

The polyimide precursor and the resin composition containing the same mentioned above can be preferably used as a flexible substrate. The polyimide precursor for an insulated electric wire and the resin composition containing the same described above can be used for a polyimide precursor for a flexible substrate and a resin composition containing the same.

A polyimide formed using the polyimide precursor or resin composition of one of embodiments is provided with a low permittivity and a high partial discharge inception voltage, and therefore, by being used in a flexible substrate, can provide a substrate having a high insulating property. Furthermore, this polyimide can be preferably applied for a flexible substrate due to having high heat resistance and high flexibility. This kind of flexible substrate is excellent in terms of dielectric characteristics, heat resistance, and mechanical characteristics, and is therefore useful in applications for vehicle-mounted pressure sensors, angle sensors, flexible substrates (FPC's) for inverter wiring, and the like.

As a flexible substrate, it is possible to have a polyimide formed using a polyimide precursor. For the polyimide precursor and polyimide, those described in the first embodiment above can be used.

The flexible substrate is provided with a base film. The base film may be a single layer or may be a laminated body. In a base film of a single layer, the polyimide of one of embodiments can be used for the base film. In a base film of a laminated body, a resin layer of the polyimide of one of embodiments and another resin layer can be used for the base film, or two or more types of the polyimide of one of embodiments having different compositions can be used for at least two layers of the base film. The other resin layers are formed, for example, by polyethylene terephthalate, liquid crystal polymer, polyamide-imide, and other polyimides besides the polyimide of one of embodiments.

The flexible substrate may be a single-sided flexible substrate in which a conductive layer such as copper foil is formed on one side of a base film, or may be a double-sided flexible substrate in which a conductive layer such as copper foil is formed on both sides of a base film.

The flexible substrate may be provided with a base film and a coating film layer. The coating film layer may be formed as a protective layer after the base film is coated with a conductive layer or the like such as copper foil. In this flexible substrate, it is preferable that at least one of the base film and the coating film layer is formed using the polyimide of one of embodiments. The base film having the polyimide of one of embodiments is as described above. When the base film is formed using other resins, the coating film layer preferably includes the polyimide of one of embodiments. Both the base film and the coating film layer may contain the polyimide of one of embodiments.

The method for manufacturing a flexible substrate can include applying a resin composition containing a polyimide precursor and a solvent, and performing heating. Those described in the first embodiment can be used for the polyimide precursor, solvent, and resin composition.

The method for manufacturing a flexible substrate from the resin composition is not particularly limited and it is possible to follow a general method. For example, the resin composition can be applied to a temporary fixing substrate, dried and heated as appropriate to promote imidization and form a polyimide resin layer, and then peeled off from the temporary fixing substrate and provided as a base film. A conductive layer such as copper foil may be further formed on the base film. Furthermore, the resin composition can be applied to the surface directly on the base film or the surface on which the conductive layer or the like is formed, and dried and heated as appropriate to promote imidization and form a polyimide resin layer as a coating film layer.

Some embodiments of the present disclosure are exemplified below.

[1] A polyimide precursor for an insulated electric wire, the polyimide precursor is a polyimide precursor including obtained by a reaction between a diamine compound and a tetracarboxylic dianhydride compound, in which the diamine compound contains at least one type selected from the group consisting of an aromatic diamine and an alicyclic diamine, the tetracarboxylic dianhydride compound contains at least one type selected from the group consisting of an aromatic tetracarboxylic dianhydride and an alicyclic tetracarboxylic dianhydride, and the total amount of the alicylic diamine and the alicyclic tetracarboxylic dianhydride is 5.0 mol % or more and 70.0 mol % or less with respect to the total amount of constituent monomers of the polyimide precursor.

[2] The polyimide precursor for an insulated electric wire according to [1], in which the alicyclic diamine is 10.0 mol % or more and 80.0 mol % or less with respect to the total amount of the diamine compound.

[3] The polyimide precursor for an insulated electric wire according to [1] or [2], wherein the alicyclic diamine contains 4,4'-methylenebis(cyclohexylamine).

[4] An insulated electric wire including a conductor and a resin film that covers the conductor, in which the resin film is a polyimide resin film obtained using the polyimide precursor for an insulated electric wire according to any one of [1] to [3].

[5] A resin composition for an insulated electric wire, containing the polyimide precursor for an insulated electric wire according to any of [1] to [3], and a solvent. [6] A method for manufacturing an insulated electric wire, the method including applying the resin composition for an insulated electric wire according to [5] to a conductor and performing heating.

Some more embodiments of the present disclosure are exemplified below.

[1] A polyimide precursor including a polyimide precursor obtained by a reaction between a diamine compound and a tetracarboxylic dianhydride compound, wherein the diamine compound contains at least one type selected from the group consisting of an aromatic diamine and an alicyclic diamine, the tetracarboxylic dianhydride compound contains at least one type selected from the group consisting of an aromatic tetracarboxylic dianhydride and an alicyclic tetracarboxylic dianhydride, and the total amount of the alicyclic diamine and the alicyclic tetracarboxylic dianhydride is 5.0 mol % or more and 70.0 mol % or less with respect to the total amount of constituent monomers of the polyimide precursor.

[2] The polyimide precursor according to [1], in which the alicyclic diamine is 10.0 mol % or more and 80.0 mol % or less with respect to the total amount of the diamine compound.

[3] The polyimide precursor according to [1] or [2], in which the alicyclic diamine contains 4,4'-methylenebis(cyclohexylamine).

[4] The polyimide precursor according to any of [1] to [3], in which the alicyclic diamine contains norbornane diamine.

[5] The polyimide precursor according to any of [1] to [4], in which the polyimide precursor is used for an insulated electric wire or is used for a flexible substrate.

[6] An insulated electric wire including a conductor and a resin film that covers the conductor, in which the resin film is a polyimide resin film obtained using the polyimide precursor according to any one of [1] to [4].

[7] A flexible substrate including a polyimide formed using the polyimide precursor according to any one of [1] to [4].

[8] A resin composition including the polyimide precursor according to any one of [1] to [5], and a solvent.

[9] A method for manufacturing an insulated electric wire, the method including applying the resin composition according to [8] to a conductor and performing heating.

[10] A method for manufacturing a flexible substrate, the method including applying the resin composition according to [8] and performing heating.

In the present specification, numerical ranges indicated using "-" represent ranges including the numerical values given before and after "-" as the minimum values and maximum values, respectively. In the numerical ranges described in steps in the present specification, the upper limits or lower limits of the numerical ranges for one step can be optionally combined with the upper limit or lower limit of the numerical range of another step. Unless specifically stated otherwise, one type of the materials exemplified in the present specification can be used alone or two or more types can be used in combination. In the present specification, the amount of each component contained in a composition, in the case where multiple substances corresponding to each component are present in the composition, means the total amount of such multiple substances present in the composition, unless specifically stated otherwise. The term "process" includes not only independent processes but also processes even if they are not clearly distinguishable from other processes, as long as the desired action of the process is achieved.

EXAMPLES

The present invention is described below in further detail using examples, but the present invention is not limited to these examples.

Production Example 1

The formulation and evaluation results of Production Example 1 are shown in Table 1. In Table 1, the composition of monomer components is expressed as 100 mol % of acid anhydride component and 100 mol % of diamine component.

Example 1

As a diamine component 56.8 g (0.27 mol) of 4,4'-methylenebis(cyclohexylamine) (hereinafter referred to as "MBCHA") and 162.2 g (0.81 mol) of 4,4'-diaminodiphenyl ether (hereinafter referred to as "ODA") were dissolved in 1800.0 g of dimethylacetamide, then as an acid anhydride component 230.9 g (1.06 mol) of pyromellitic dianhydride (hereinafter referred to as "PMDA") was added, and then the mixture was stirred at room temperature to obtain a resin composition containing a polyimide precursor having an alicyclic structure.

Example 2

As a diamine component 48.2 g (0.23 mol) of MBCHA and 137.6 g (0.69 mol) of ODA were dissolved in 1800.0 g of dimethylacetamide, then as an acid anhydride component 264.2 g (0.90 mol) of 3,3',4,4'-biphenyltetracarboxylic dianhydride (hereinafter referred to as "BPDA") was added, and then the mixture was stirred at room temperature to obtain a resin composition containing a polyimide precursor having an alicyclic structure.

Example 3

As a diamine component 63.3 g (0.27 mol) of 4,4'-methylenebis(2-methylcyclohexylamine) (hereinafter referred to as "M-MBCHA") and 159.6 g (0.80 mol) of ODA were dissolved in 1800.0 g of dimethylacetamide, then as an acid anhydride component 227.1 g (1.04 mol) of PMDA was added, and then the mixture was stirred at room temperature to obtain a resin composition containing a polyimide precursor having an alicyclic structure.

Example 4

As a diamine component 43.1 g (0.28 mol) of norbornane diamine (hereinafter referred to as "NBDA") and 167.9 g (0.84 mol) of ODA were dissolved in 1800.0 g of dimethylacetamide, then as an acid anhydride component 239.0 g (1.10 mol) of PMDA was added, and then the mixture was stirred at room temperature to obtain a resin composition containing a polyimide precursor having an alicyclic structure.

Comparative Example 1

As a diamine component 217.7 g (1.09 mol) of ODA was dissolved in 1800.0 g of dimethylacetamide, then as an acid anhydride component 232.3 g (1.07 mol) of PMDA was added, and then the mixture was stirred at room temperature to obtain a resin composition containing a polyimide precursor.

(Evaluation of Resin Composition)

The external appearance of the obtained resin composition was observed and evaluated according to the following criteria.

◯: No foaming was observed in the resin composition and it was in a good state.

x: Foaming was observed in the resin composition.

The viscosity of the obtained resin composition was measured according to the following conditions.

Measurement temperature: 30° C.

Measurement condition: No. 3 rotor

Measurement device: B-type viscometer Vismetron VDA2 Viscometer (manufactured by Shibaura System Co., Ltd.)

Test Example

An obtained resin composition was applied to a 1.0-mm diameter copper wire according to the following baking conditions, and baked at a linear velocity of 16 m/min to produce an insulated electric wire.

"Application/Baking Conditions"

Baking furnace: Hot-air vertical furnace (furnace length 5.5 m)

Furnace temperature: Inlet/outlet=320° C./430° C.

Coating method: A procedure in which an insulated electric wire dipped in the resin composition was squeezed with a die and passed through the baking furnace was performed 10 times. The diameter of the die from the first pass to the tenth pass was altered to 1.06 mm. 1.07 mm, 1.08 mm, 1.09 mm, 1.10 mm, 1.11 mm, 1.12 mm, 1.13 mm, 1.14 mm, and 1.15 mm.

Characteristics of the obtained insulated electric wire (flexibility, adhesion, dielectric breakdown voltage, and softening resistance) were measured based on JIS C3216.

The coating film thickness of the obtained insulated electric wire was measured using a micrometer ("MDH-25M" manufactured by Mitutoyo Corporation).

(Measurement of Relative Permittivity)

The relative permittivity of the insulation layer was measured for an obtained insulated electric wire. As shown in the FIGURE, a sample for measurement was produced by applying silver paste 1 to a 100-mm section in the center of an insulated electric wire 10. In the same drawing, 2 is an insulation layer and 3 is a copper wire. The capacitance between the copper wire 3 and the silver paste 1 was measured with an LCR meter 4, and the permittivity was calculated from the measured capacitance value and the thickness of the insulation layer 2 to obtain the relative permittivity. Note that the measurement was performed at room temperature.

TABLE 1

| | | Example 1 | Example 2 | Example 3 | Example 4 | Comparative Example 1 |
|---|---|---|---|---|---|---|
| Composition (mol %) | PMDA | 100 | — | 100 | 100 | 100 |
| | BPDA | — | 100 | — | — | — |
| | ODA | 75 | 75 | 75 | 75 | 100 |
| | MBCHA | 25 | 25 | — | — | — |
| | M-MBCHA | — | — | 25 | — | — |
| | NBDA | — | — | — | 25 | — |
| Resin composition characteristics | External appearance | ○ | ○ | ○ | ○ | ○ |
| | Viscosity (Pa · s) | 3.3 | 4.9 | 3.7 | 2.0 | 3.6 |
| | Resin content concentration (% by mass) | 20 | 20 | 20 | 20 | 20 |
| Insulated electric wire characteristics | Relative permittivity | 3.1 | 2.9 | 3.0 | 3.0 | 3.2 |
| | Coating film thickness (μm) | 33.1 | 29.3 | 32.1 | 30.0 | 30.9 |
| | Flexibility (20% elongation) | 1d | 1d | 1d | 1d | 1d |
| | Adhesion (twisting, times) | 137 | 128 | 112 | 168 | 120 |
| | Dielectric breakdown voltage (kV) | 14.5 | 6.8 | 12.4 | 12.8 | 12.9 |
| | Softening resistance (° C., wt = 700 g) | >480 | 336 | >480 | >480 | >480 |

As shown in Table 1, in Examples 1-4, insulated electric wires were produced using polyimide precursors containing 12.5 mol % of alicyclic diamine with respect to the total amount of constituent monomers, and insulated electric wires with a low permittivity and a high dielectric breakdown voltage and with excellent heat resistance, flexibility, and adhesion were obtained.

Production Example 2

The formulation and evaluation results of Production Example 2 are shown in Table 2. In Table 2, the composition of monomer components is expressed as 100 mol % of acid anhydride component and 100 mol % of diamine component. Parts for which no description in particular is given are the same as in Production Example 1 described above.

Example 5

As a diamine component 204.1 g (0.55 mol) of 4,4'-bis (4-aminophenoxy) biphenyl (hereinafter referred to as "BODA") and 28.5 g (0.18 mol) of NBDA were dissolved in 1800.0 g of dimethylacetamide, then as an acid anhydride component 213.0 g (0.72 mol) of BPDA was added, and then the mixture was stirred at room temperature to obtain a resin composition containing a polyimide precursor having an alicyclic structure.

Example 6

As a diamine component 149.2 g (0.40 mol) of BODA and 62.5 g (0.41 mol) of NBDA were dissolved in 1800.0 g of dimethylacetamide, then as an acid anhydride component 233.5 g (0.79 mol) of BPDA was added, and then the mixture was stirred at room temperature to obtain a resin composition containing a polyimide precursor having an alicyclic structure.

Example 7

As a diamine component 220.9 g (1.05 mol) of MBCHA was dissolved in 1800.0 g of dimethylacetamide, then as an acid anhydride component 224.5 g (1.03 mol) of PMDA was added, and then the mixture was stirred at room temperature to obtain a resin composition containing a polyimide precursor having an alicyclic structure.

Example 8

As a diamine component 187.6 g (0.89 mol) of MBCHA was dissolved in 1800.0 g of dimethylacetamide, then as an acid anhydride component 257.1 g (0.87 mol) of BPDA was added, and then the mixture was stirred at room temperature to obtain a resin composition containing a polyimide precursor having an alicyclic structure.

The characteristics of the resin compositions and the characteristics of the insulated electric wires were evaluated according to the same procedure as in Production Example 1 described above.

TABLE 2

| | | Example 5 | Example 6 | Example 7 | Example 8 |
|---|---|---|---|---|---|
| Composition (mol %) | PMDA | — | — | 100 | — |
| | BPDA | 100 | 100 | — | 100 |
| | ODA | — | — | — | — |
| | BODA | 75 | 50 | — | — |
| | MBCHA | — | — | 100 | 100 |
| | M-MBCHA | — | — | — | — |
| | NBDA | 25 | 50 | — | — |
| Resin composition characteristics | External appearance | ○ | ○ | ○ | ○ |
| | Viscosity (Pa · s) | 3.5 | 3.7 | 5.2 | 4.8 |
| | Resin content concentration (% by mass) | 20 | 20 | 20 | 20 |
| Insulated electric wire characteristics | Relative permittivity | 3.0 | 2.9 | 2.8 | 2.8 |
| | Coating film thickness (μm) | 30.9 | 31.2 | 33.2 | 33.2 |
| | Flexibility (20% elongation) | 1d | 1d | 1d | 1d |
| | Adhesion (twisting, times) | 123 | 136 | 108 | 94 |

TABLE 2-continued

|  | Example 5 | Example 6 | Example 7 | Example 8 |
|---|---|---|---|---|
| Dielectric breakdown voltage (kV) | 9.7 | 10.2 | 12.5 | 10.9 |
| Softening resistance (° C., wt = 700 g) | 410 | 390 | >480 | 288 |

As shown in Table 2, in Examples 5-8, insulated electric wires were produced using polyimide precursors containing 12.5-50 mol % of alicyclic diamine with respect to the total amount of constituent monomers, and insulated electric wires with a low permittivity and a high dielectric breakdown voltage and with excellent heat resistance, flexibility, and adhesion were obtained.

Examples 5 and 6 had the same formulation except for the different proportions of alicyclic diamine. Example 5, which had a smaller proportion of alicyclic diamine, exhibited a more improved heat resistance. Meanwhile, Example 6, which had with a larger proportion of alicyclic diamine, exhibited a lower relative permittivity and a higher dielectric breakdown voltage.

In Examples 7 and 8, the proportion of alicyclic diamine was large at 50 mol % with respect to the total amount of constituent monomers, and it was possible to obtain insulated electric wires having a low permittivity and a high dielectric breakdown voltage.

EXPLANATION OF REFERENCE NUMERALS

1: silver paste, 2: insulation layer, 3: copper wire, 4: LCR meter, 10: insulated electric wire

The invention claimed is:

1. A polyimide precursor, comprising: a polyimide precursor obtained by a reaction between a diamine compound and a tetracarboxylic dianhydride compound, wherein the diamine compound contains an aromatic diamine and an alicyclic diamine, the alicyclic diamine containing at least one type selected from the group consisting of 4,4'-methylenebis(cyclohexylamine) and norbornane diamine, an amount of the aromatic diamine is 40 mol % or more and 80.0 mol % or less with respect to a total amount of the diamine compound, the tetracarboxylic dianhydride compound contains at least one type selected from the group consisting of an aromatic tetracarboxylic dianhydride and an alicyclic tetracarboxylic dianhydride, and a total amount of the alicyclic diamine and the alicyclic tetracarboxylic dianhydride is 5.0 mol % or more and 30.0 mol % or less with respect to a total amount of constituent monomers of the polyimide precursor.

2. The polyimide precursor according to claim 1, wherein the amount of alicyclic diamine is 10.0 mol % or more and 60.0 mol % or less with respect to a total amount of the diamine compound.

3. The polyimide precursor according to claim 1, wherein the alicyclic diamine contains 4,4'-methylenebis(cyclohexylamine).

4. The polyimide precursor according to claim 3, wherein the tetracarboxylic dianhydride compound contains pyromellitic dianhydride.

5. The polyimide precursor according to claim 4, wherein the alicyclic diamine contains 4,4'-methylenebis(cyclohexylamine) in an amount of 5.0 mol % or more and 30.0 mol % or less with respect to a total amount of constituent monomers of the polyimide precursor.

6. The polyimide precursor according to claim 5, wherein the alicyclic diamine contains 4,4'-methylenebis(cyclohexylamine) in an amount of 10.0 mol % or more and 60.0 mol % or less with respect to a total amount of the diamine compound.

7. The polyimide precursor according to claim 6, wherein the polyimide precursor is used for an insulated electric wire.

8. The polyimide precursor according to claim 1, wherein the alicyclic diamine contains norbornane diamine.

9. The polyimide precursor according to claim 1, wherein the polyimide precursor is used for an insulated electric wire or is used for a flexible substrate.

10. The polyimide precursor according to claim 1, wherein the tetracarboxylic dianhydride compound contains pyromellitic dianhydride.

11. An insulated electric wire, comprising: a conductor and a resin film that covers the conductor, wherein the resin film is a polyimide resin film obtained using the polyimide precursor according to claim 1.

12. A flexible, substrate: comprising a polyimide formed using the polyimide precursor according to claim 1.

13. A resin composition, comprising: the polyimide precursor according to claim 1, and a solvent.

14. A method for manufacturing an insulated electric wire, the method comprising: applying the resin composition according to claim 13 to a conductor and performing heating.

15. A method for manufacturing a flexible substrate, the method comprising applying the resin composition according to claim 13 and performing heating.

16. An insulated electric wire including a conductor and a resin film that covers the conductor, wherein the resin film is a polyimide resin film obtained using the polyimide precursor according to claim 6.

* * * * *